(12) United States Patent
Wright et al.

(10) Patent No.: US 10,965,461 B1
(45) Date of Patent: Mar. 30, 2021

(54) METHOD OF VERIFYING TELECOMMUNICATIONS MESSAGING TRAFFIC BASED ON DECENTRALIZED IDENTIFIERS

(71) Applicant: Syniverse Technologies, LLC, Tampa, FL (US)

(72) Inventors: Chris Wright, Plant City, FL (US); Monique Jeanne Morrow, Zurich (CH)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/008,066

(22) Filed: Aug. 31, 2020

(51) Int. Cl.
*H04L 9/14* (2006.01)
*H04L 9/32* (2006.01)

(52) U.S. Cl.
CPC .............. *H04L 9/14* (2013.01); *H04L 9/3242* (2013.01)

(58) Field of Classification Search
CPC ................................ H04L 9/14; H04L 9/3242
See application file for complete search history.

(56) References Cited

U.S. PATENT DOCUMENTS

| | | | | |
|---|---|---|---|---|
| 9,679,276 | B1* | 6/2017 | Cuende | H04L 9/3236 |
| 10,348,707 | B2* | 7/2019 | Ateniese | G06F 3/0659 |
| 10,505,726 | B1* | 12/2019 | Andon | G06F 16/2457 |
| 10,602,202 | B1* | 3/2020 | Taylor | G06F 16/48 |
| 10,637,666 | B1* | 4/2020 | Blankstein | G06F 3/0622 |
| 2015/0356523 | A1* | 12/2015 | Madden | G06Q 20/065 705/76 |
| 2016/0283920 | A1* | 9/2016 | Fisher | H04L 9/3297 |
| 2016/0344737 | A1* | 11/2016 | Anton | G06F 21/6218 |
| 2018/0103042 | A1* | 4/2018 | Castagna | H04L 63/0428 |
| 2019/0013934 | A1* | 1/2019 | Mercuri | G06F 9/546 |
| 2019/0163883 | A1* | 5/2019 | Savanah | H04L 9/3236 |
| 2019/0340362 | A1* | 11/2019 | Wright | H04L 63/0823 |
| 2020/0092292 | A1* | 3/2020 | Patel | H04W 12/08 |

(Continued)

OTHER PUBLICATIONS

Ali et al. (Blockstack: A Global Naming and Storage System Secured by Blockchains, USENIX, 2016, 15 pages) (Year: 2016).*

(Continued)

*Primary Examiner* — Oleg Korsak
(74) *Attorney, Agent, or Firm* — Andriy Lytvyn; Smith & Hopen, P.A.

(57) ABSTRACT

A method of verifying telecommunications messaging traffic between two entities and monetizing the verified traffic. A receiving entity receives a message from a sending entity. The message includes a hash value computed by the sending entity based on the content of the message. The hash value is encrypted using a private key of the sending entity. The receiving entity identifies, within a blockchain, a Decentralized Identifier (DID) associated with the sending entity, resolves the DID into a DID document, and retrieves therefrom a public key associated with the sending entity. The receiving entity decrypts the hash value provided by the sending entity using the retrieved public key. The receiving entity independently computes a hash value based on the message content and compares the computed hash value against the decrypted hash value. If the hash values match, the message is verified and routed to its target recipient.

20 Claims, 10 Drawing Sheets

(56) References Cited

U.S. PATENT DOCUMENTS

2020/0293663 A1\* 9/2020 Mugundan ........ H04W 12/1202

OTHER PUBLICATIONS

Herbert et al. (A Novel Method for Decentralised Peer-to-Peer Software License Validation Using Cryptocurrency Blockchain Technology, ACSC 2015, 9 pages) (Year: 2015).\*

Kiara Robles (Decentralized Identifiers (DIDs) and Decentralized Identity Management (DIDM), Respect Network May 16, 2016, 6 pages) (Year: 2016).\*

NPL Reis (Decentralized Identifiers (DIDs) and Decentralized Identity Management (DIDM), Universade Nova De Lisboa, Sep. 2019, 125 pages) (Year: 2019).\*

Microsoft (Decentralized Identity, 2018, 23 pages) (Year: 2018).\*

Sivakumar et al. (Privacy based decentralized Public Key Infrastructure (PKI) implementation using Smart contract in Blockchain, 2017, 6 pages) (Year: 2017).\*

Dunphy et al. (A First Look at Identity Management Schemes on the Blockchain, IEEE 2018, 17 pages) (Year: 2018).\*

Zyskind et al. (Decentralizing Privacy: Using Blockchain to Protect Personal Data, IEEE 2015, 5 pages) (Year: 2015).\*

NPL Reed et al. (Decentralized Identifiers (DIDs) v1.0, W3C Working Draft Jul. 31, 2020, 62 pages) (Year: 2020).\*

Bhowmik et al. (The multimedia blockchain: a distributed and tamper-proof media transaction framework, IEEE 2018, 17 pages) (Year: 2018).\*

Goodell et al. (A Decentralized Digital Identity Architecture, Frontiers in Blockchain, Nov. 2019, 19 pages) (Year: 2019).\*

Papageorgiou et al. (DPKI: A Blockchain-Based Decentralized Public Key Infrastructure System, IEEE 2020, 5 pages) (Year: 2020).\*

Faisca et al et al. (A Decentralized Digital Identity Architecture, Frontiers in Blockchain, Semantics 2016, 4 pages) (Year: 2016).\*

\* cited by examiner

| Transaction ID | MNO Trust Check | MNO Trust Check | MNO Trust Confirm | MNO Trust Confirm | "Ok" to Distribute All Parties | Post final to Ledger |
|---|---|---|---|---|---|---|
| Unique Transaction Identifier | • Status (pass/fail)<br>• Service provider ID<br>• Timestamp | • Status (pass/fail)<br>• Service provider ID<br>• Timestamp | • Status (pass/fail)<br>• Service provider ID<br>• Timestamp | • Status (pass/fail)<br>• Service provider ID<br>• Timestamp | | |
| ab787478-34e2-54b7-9aca-64ec9bd6b84c | • Pass<br>• MNO<br>• 05/25/2020T 12:31Z | • Pass<br>• MNO<br>• 05/25/2020T 12:32Z | • Pass<br>• MNO<br>• 05/25/2020T12 :33Z | • Pass<br>• SP1<br>• 05/25/2020T12: 33Z | | |
| 787478-34e2ab-54b7-adbf-64ec9bd6b84c | • Pass<br>• MNO<br>• 05/25/2020T 12:31Z | • Pass<br>• MNO<br>• 05/25/2020T 12:32Z | • Pass<br>• MNO<br>• 05/25/2020T12 :33Z | • Pass<br>• MNO<br>• 05/25/2020T12: 33Z | | |
| ... | ... | ... | ... | ... | | |

*FIG. 8*

METHOD OF VERIFYING TELECOMMUNICATIONS MESSAGING TRAFFIC BASED ON DECENTRALIZED IDENTIFIERS

BACKGROUND OF THE INVENTION

1. Field of the Invention

This invention relates generally to the field of telecommunication networks. More specifically, the invention pertains to a method of verifying messaging traffic based on Decentralized Identifiers (DIDs) and monetizing the verified traffic with automated agreement and funds distribution.

2. Brief Description of the Related Art

Unsolicited commercial messages (spam) is a well-known and prevalent problem for Mobile Network Operators (MNOs). This problem is two-fold: first, spam is a major nuisance for MNOs' subscribers, and, second, spam messages waste valuable network resources. MNOs have extended significant resources combatting spam, with little sustained success. Most existing anti-spam measures can generally be bypassed by utilizing one of a large number of various schemes. Thus, what is needed is a global solution that enables MNOs to efficiently and permanently disable a spamming enterprise and a way to monetize verified legitimate messaging traffic.

SUMMARY OF THE INVENTION

The invention provides a novel and non-obvious solution to the telecommunications spam problem identified above. In an embodiment, the invention pertains to a method of verifying a media object (e.g., a message) sent via a telecommunication network. The message is sent from a sending entity to a receiving entity.

Initially, prior to being able to send a message to an MNO subscriber, the sending entity must complete the registration process. The registration process involves invoking a decentralized public key infrastructure (DPKI) service to generate a private/public key pair for the sending entity. The private key is securely shared with the sending entity. Next, a first Decentralized Identity (DID) is generated. The DID is configured to be resolved into a DID document containing the public key of the sending entity. The DID is registered with a blockchain, wherein the DID can be retrieved from the blockchain using a sender identifier included with the media object.

After registration steps have been completed, the sending entity can send a media object to the receiving entity. The media object must include a first hash value provided by the sending entity. The sending entity computes the first hash value based on the content of the media object. Prior to sending the media object, the sending entity encrypts the first hash value with its private key.

Upon receipt of the media object, the receiving entity identifies the DID associated with the sending entity within the blockchain. Next, the DID is resolved into the DID document, and the public key associated with the sending entity is retrieved therefrom. The retrieved public key is used to decrypt the hash value the sending entity appended to the media object.

To verify the media object, the receiving entity independently computes a hash value based on the content of the media object. Then, the independently computed hash value is compared against the decrypted hash value. If hash values match, the media object is successfully verified and routed to its target recipient.

After verification of the media object is successfully completed, the receiving entity can register a transaction record associated with verification of the media object with the blockchain. This enables the receiving entity to evoke a predefined protocol ("Protocol F") upon verifying the media object, wherein the predefined protocol is configured to trigger a predetermined monetary fund distribution to the receiving entity. Subsequent to the funds being distributed, a corresponding message is posted to the blockchain.

The invention applies across multiple types of messaging traffic, and, therefore, the term "media object" encompasses a Short Message Service (SMS), a Multimedia Messaging Service (MIMS), a Rich Communication Service (RCS), a voice service, and any messaging type that might be implement in the future.

As an additional security and privacy measure, the DIDs described above can be pairwise DIDs specific to a relationship between the sending entity and the receiving entity and/or the enterprise and the sending entity.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Embodiments of the present invention pertain to a method of source-destination verification via centralized identifier constructs. This novel and non-obvious method enables a Mobile Network Operator (MNO) to control unsolicited media objects (spam) sent to its subscribers. This method further enables MNOs to detect and prevent unauthorized routing of media objects. Furthermore, MNOs have an ability to verify and monetize legitimate traffic.

Figure 1:
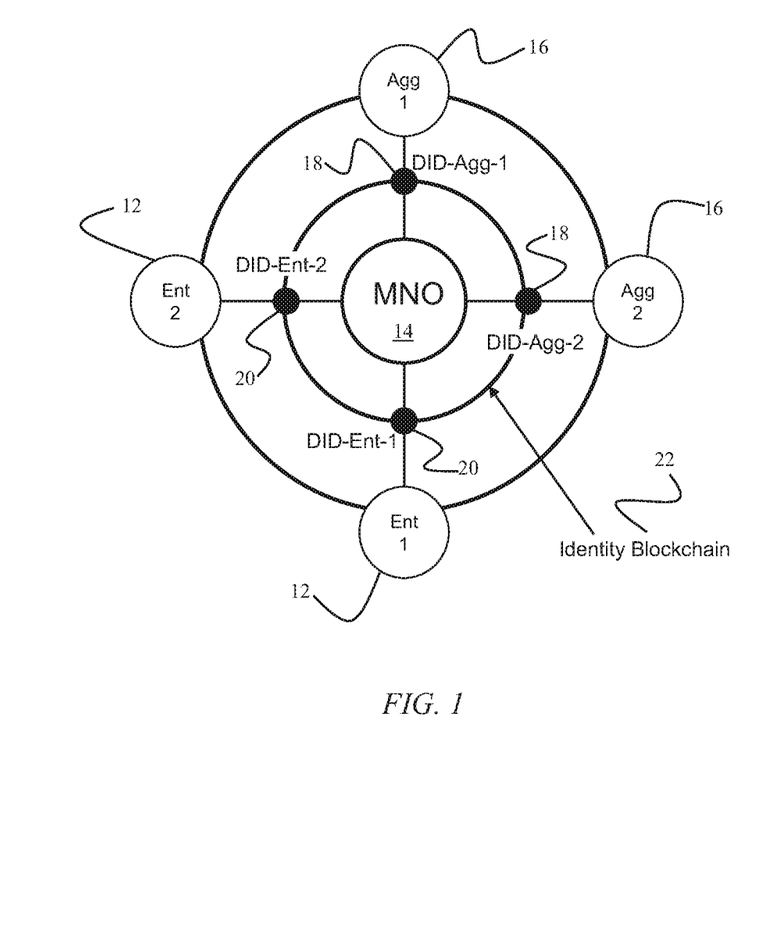
FIG. 1 is a schematic drawing depicting relationships between various entities interacting with one another, according to an embodiment of the invention.

FIG. 1 pertains to an embodiment of the invention in which Enterprises 12 send media objects to subscribers of an MNO 14 via media object Aggregators 16. As used herein, the term "media object" encompasses Short Message Services ("SMS"), Multimedia Messaging Services ("MMS"), Rich Communication Services ("RCS"), voice, and any other media type currently known or invented in the future that can be transmitted via various means from Enterprise 12 to MNO 14.

One aspect of the invention pertains to using Decentralized Identifiers (DIDs) to verify that a media object intended for a subscriber of MNO 14 originates from a legitimate Enterprise 12. DIDs are described in W3C Working Draft dated Jul. 31, 2020, entitled "Decentralized Identifiers (DIDs) v1.0: Core Architecture, Data Model, and Representations," which is incorporated herein by reference.

A DID is a new type of identifier that enables verifiable, decentralized digital identity. DIDs are designed in such a manner that an entity controlling a particular DID can prove control over that DID without requiring permission from any other party. DIDs are Uniform Resource Locators (URLs) that associate a DID subject with a DID Document, thereby allowing trustable interactions associated with that subject.

A DID Document can be configured to contain a public key held by the entity that controls the DID. DID Documents can be written in JavaScript Object Notation (JSON). A Decentralized Public Key Infrastructure (DPKI) service can be invoked to generate a DID Document. DIDs and DID Documents can be adapted to any blockchain, distributed ledger, or other decentralized network capable of resolving a unique key into a corresponding unique value. The present invention implements DIDs and DID Documents in a novel and non-obvious manner to verify messaging traffic.

FIG. 1 depicts an embodiment of the invention, in which a first set of DIDs 18 (associated Aggregators 16) and a second set of DIDs 20 (associated with Enterprises 12) are registered with Identity Blockchain 22. Each DID 18 can be resolved into its respective DID Document containing a public key for the corresponding Aggregator 16, while each DID 20 can be resolved into its respective DID Document containing a public key for the corresponding Enterprise 12. In an embodiment, for added security, DIDs 18 and/or 20 can be pairwise DIDs issued on a per-relationship basis-e.g., relationships between Aggregator 16 and MNO 14 and Enterprise 12 and MNO 14. Pairwise DIDs are described in W3C Draft Community Group Report dated Jan. 19, 2019, entitled "*A Primer for Decentralized Identifiers*," which is incorporated herein by reference.

As discussed above, in the embodiment of FIG. 1, DIDs 18 and 20 are registered within Identity Blockchain 22. Corresponding DID Documents can also be stored directly on Identity Blockchain 22. Alternatively, certain attributes of DID Documents can be recorded in Identity Blockchain 22, and a DID Resolver can be used to dynamically construct DID Documents based on these recorded attributes. In yet another embodiment, a pointer to a DID Document may be stored on Identity Blockchain 22, while the DID Document can be stored in one or more parts on other decentralized storage networks. All implementations described above fall within the scope of the present invention.

Continuing reference to FIG. 1, an exemplary use case depicted therein pertains to a scenario in which an Enterprise 12 sends a media object to a subscriber of MNO 14 via Aggregator 16. In this embodiment, the invention can involve a multi-stage registration process having the following three stages: (1) registration of Aggregator 16, (2) registration of Enterprise 12, and (3) registration of a sender address 26 associated with Enterprise 12. Each stage is disclosed in more detail below.

Registration Process

Figure 2:
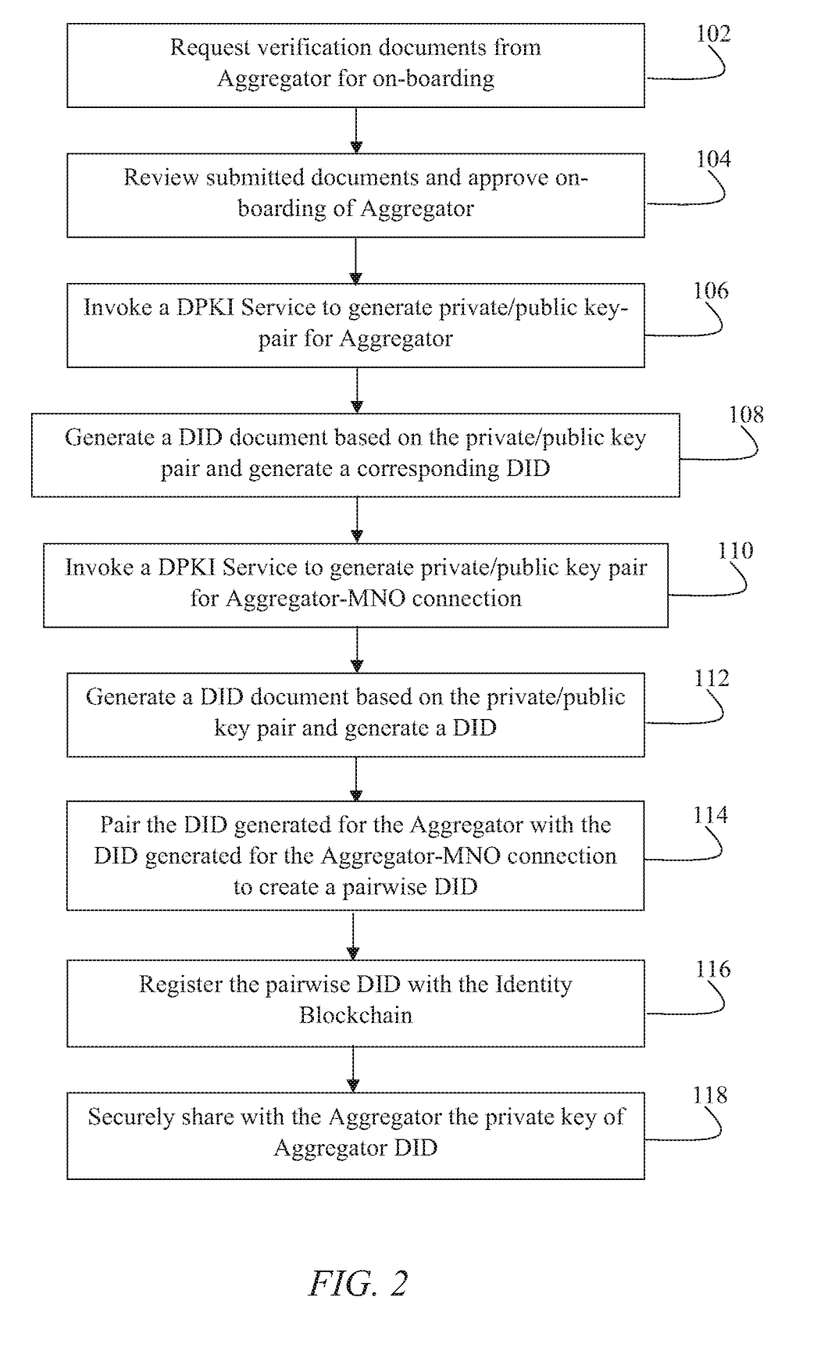
FIG. 2 is a flowchart depicting the steps of an on-boarding process for registering a messaging aggregator and Decentralized Identifier (DID) associated therewith.

The flowchart provided in FIG. 2 depicts exemplary steps for registration of Aggregator 16 with MNO 14. In step 102, Virtual Mobile Network Operator (VMNO) or MNO 14 requests verification documents from Aggregator 16 for on-boarding procedure. In step 104, MNO 14 reviews the received documents and approves on-boarding of Aggregator 16. In step 106, MNO 14 invokes Decentralized Public Key Infrastructure (DPKI) service to generate a private/public key pair for Aggregator 16. In step 108, MNO 14 generates a DID Document based on the private/public key pair (from step 106) and generates a corresponding DID.

In step 110, MNO 14 invokes the DPKI service to generate another private/public key pair-this time, for Aggregator-MNO relationship. Then, in step 112, MNO 14 generates the corresponding DID Document and a DID based on this private/public key pair.

Next, in step 114, the DIDs generated in steps 108 and 110 are paired together, thereby creating a pairwise DID 18. In step 116, MNO 14 registers the pairwise DID 18 with the Identity Blockchain 22. In step 118, MNO 14 securely shares with Aggregator 16 the private key associated therewith.

Alternatively, instead of MNO executing the above steps, a trusted central entity can be used to invoke the DPKI services to generate the private/public keys, corresponding DIDs, and to register the pairwise DID 20 into Identity Blockchain 22. Furthermore, the above method is not limited to registration of Aggregator 16 with MNO 14 and can be used to establish the initial registration between any two entities.

Figure 3:
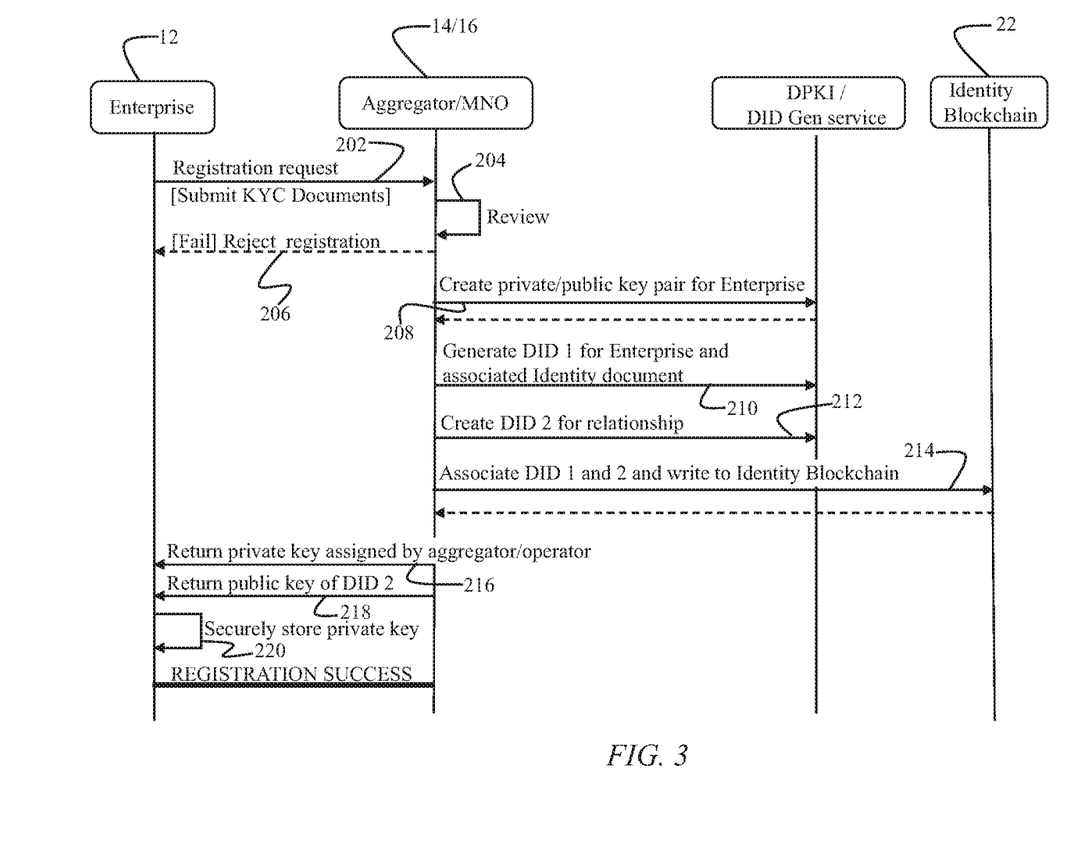
FIG. 3 is a signaling flow diagram depicting the steps of registering an Enterprise.

Next, FIG. 3 depicts a signaling diagram for registration of Enterprise 12. The process initiates at step 202, in which Enterprise 12 sends registration documents to Aggregator 16 or MNO 14. In step 204, Aggregator 16/MNO 14 reviews the documents. If the documents do not comply with pre-defined criteria, Aggregator 16/MNO 14 responds to Enterprise 12 with a rejection message in step 206. Otherwise, if the submitted documents pass the review, in step 208, a DPKI service is invoked to generate a private/public key pair for Enterprise 12. In step 210, a DID is generated for Enterprise 12, wherein the generated DID is associated with the identity of Enterprise 12.

Next, in step 212, a DID is generated for the relationship between Enterprise 12 and Aggregator 16/MNO 14. Then, in step 214, the DID associated with the identity of Enterprise 12 and the DID associated with the relationship between Enterprise 12 and Aggregator 16/MNO 14 are paired together to create a pairwise DID 20, which is registered with Identity Blockchain 22. In step 216, private key associated with the Enterprise 12 is securely shared therewith. In step 218, public key of the DID associated with relationship between Enterprise 12 and Aggregator 16/MNO 14 is shared with Enterprise 12. In step 220, Enterprise 12 securely stores the private key. At this point, the registration of Enterprise 12 is complete.

Figure 4:
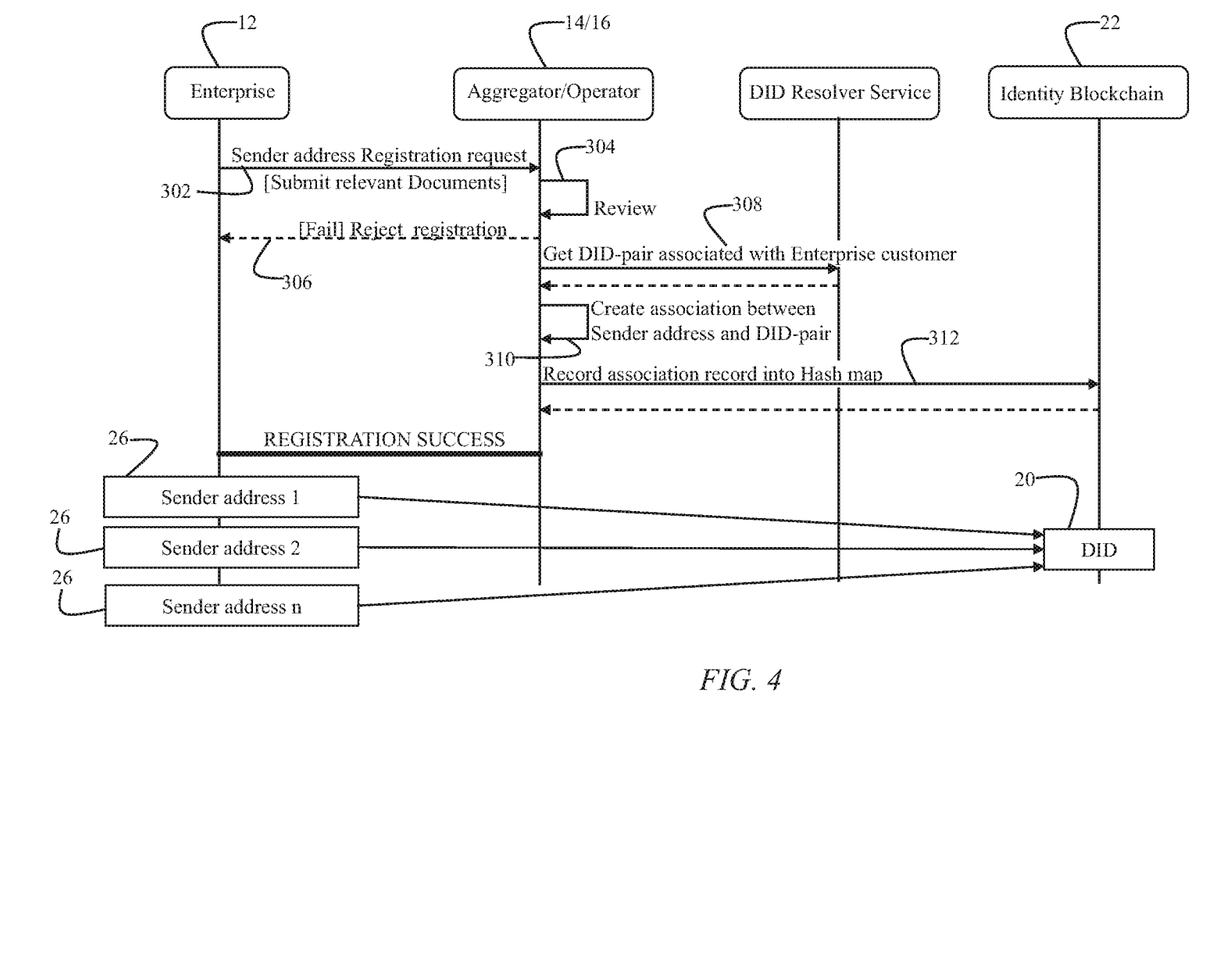
FIG. 4 is a signaling flow diagram depicting the steps of registering a sender address associated with the Enterprise.

FIG. 4 depicts a signaling flow diagram for the third stage of the registration process, during which Enterprise 12 registers one or more sender addresses 26. The process begins with step 302, in which Enterprise 12 sends a sender address registration request to Aggregator 16 or MNO 14. In step 304, Aggregator 16/MNO 14 reviews the relevant documents and decides whether the address registration request should be approved. If the documents fail to satisfy predefined criteria, Aggregator 16/MNO 14 rejects the sender address registration request in step 306. Otherwise, if the documents pass the review, in step 308, Aggregator 16/MNO 14 invokes a DID resolver service to retrieve pairwise DID 20 associated with Enterprise 12. In step 310, Aggregator 16/MNO 14 creates association between the sender address 26 and pairwise DID 20 retrieved in the previous step. In step 312, this association is recorded into a hash map on Identity Blockchain 22. At this point, the sender address registration is complete. This process can be repeated for additional sender addresses 26 associated with Enterprise 12.

If a sender address 26 of Enterprise 12 is reported to be sending spam to MNO Subscribers 24, MNO 14 has the power to take corrective action. Specifically, MNO 14 can delete respective entries associated with sender address 26 from the hash map, thereby dissociating DID 20 from sender address 26. In this manner, subsequent messages from sender address 26 will be rejected because the DID lookup based on sender address 26 will fail and will not retrieve the correct DID 20, which is necessary to pass the verification process as described in more detail below. Thus, subsequent messages from sender address 26 will be blocked.

Also, DID 20 associated with Enterprise 12 can be revoked, thus stripping Enterprise 12, and all sender addresses 26 associated therewith, of the ability to send messages to MNO Subscribers. As part of verification process, a revoked DID is considered failed verification and the message will not be forwarded for delivery. Furthermore, messages failed due to verification checks can be provided into a data lake for application of an artificial intelligence (AI)/machine learning (ML) algorithms to identify patterns employed by a spammer. In this manner, future spam messages can be identified either automatically through AI/ML or by enabling MNO Subscribers 24 to report spam to MNO 14.

Verification Process

Figure 5A:
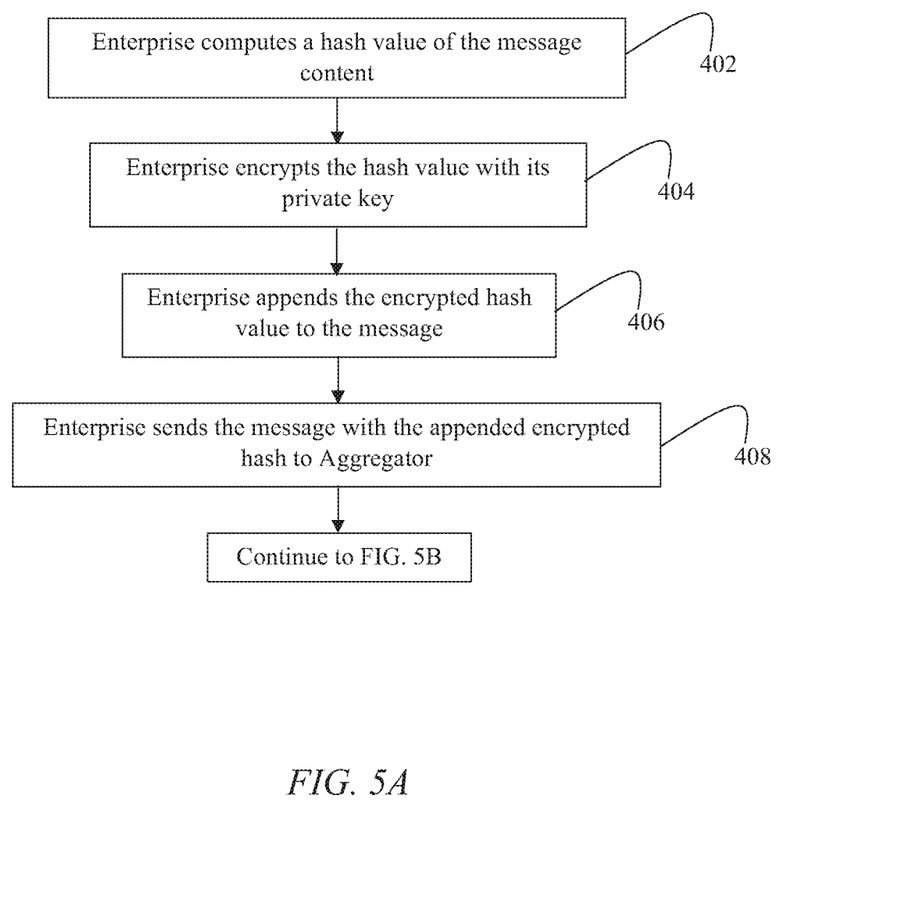
FIG. 5A is a flowchart depicting the process an Enterprise follows to send a message.
Figure 5B:
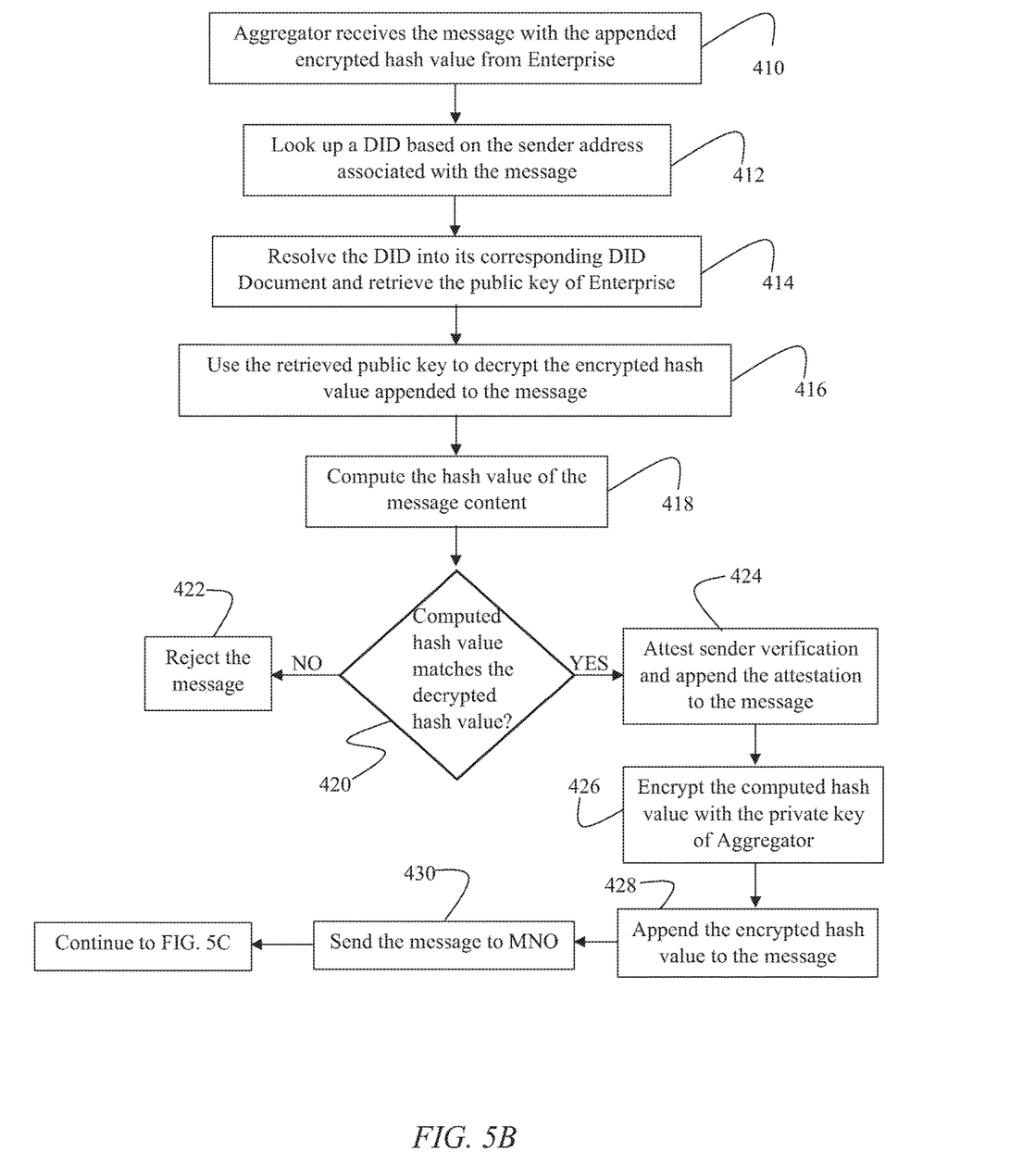
FIG. 5B is a flowchart depicting the process for an Aggregator verification of the message sent by the Enterprise.
Figure 5C:
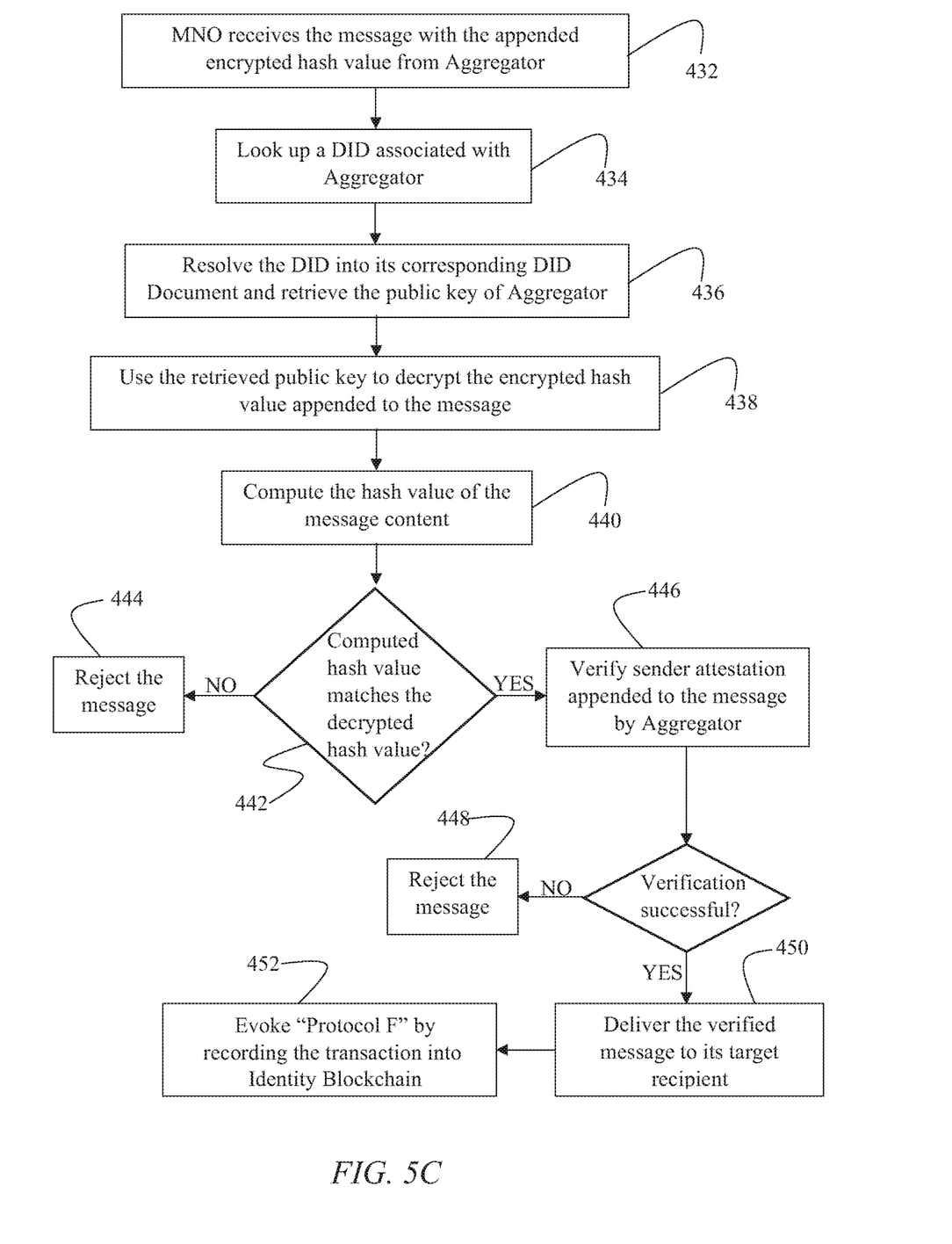
FIG. 5C is a flowchart depicting the process for Mobile Network Operator (MNO) verification of the message received from the Aggregator.

FIGS. 5A-C depict an exemplary two-stage verification process during which the legitimacy of the origin and routing path of a media object sent to a subscriber of MNO 14 is verified. FIG. 5A depicts the steps that Enterprise 12 takes when sending the media object. In this example, the media object is a message. First, in step 402, Enterprise 12 computes a hash of the message content. In step 404, Enterprise 12 encrypts the hash with the private key issued by Aggregator 16 or MNO 14 (step 216 of FIG. 3). In step 406, Enterprise 12 appends the encrypted hash as a predefined optional parameter of the message. In step 408, Enterprise 12 submits the message to Aggregator 16 (or, alternatively, to MNO 14).

The verification process continues to FIG. 5B. In step 410, Aggregator 16 receives the message from enterprise 12. In step 412, Aggregator 16 looks up DID 20 associated with Enterprise 12 based on the sender address 26 from which the message originated. In step 414, Aggregator 16 resolves DID 20 into its corresponding DID Document and retrieves the public key of Enterprise 12 from the DID Document. In step 416, Aggregator 16 uses the retrieved public key of Enterprise 12 to decrypt the encrypted hash appended to the message.

Next, in step 418, Aggregator 16 independently computes the hash of the message content. In step 420, Aggregator 16 compares the hash value computed in step 418 with the decrypted hash value. If the computed hash and the decrypted hash values do not match, Aggregator 16 rejects the message in step 422. Otherwise, if the hash values match, the method proceeds to step 424, in which Aggregator 16 attests sender verification and appends this attestation to the message. In step 426, Aggregator 16 encrypts the computed hash using the private key issued to Aggregator 16 by MNO 14 (step 118 of FIG. 2). In step 428, Aggregator 16 appends the encrypted hash to the message. In step 430, Aggregator 16 routes the message to MNO 14.

The verification method continues in FIG. 5C. In step 432, MNO 14 receives the message from Aggregator 16. In step 434, MNO 14 accesses DID 18 associated with Aggregator 16 (registered with Identity Blockchain 22 in step 416 of FIG. 2). In step 436, MNO 14 resolves DID 18 into a corresponding DID Document and retrieves the public key of Aggregator 16 from the DID Document. In step 438, MNO 14 uses the retrieved public key to decrypt the hash appended to the message by Aggregator 16.

Next, in step 440, MNO 14 independently computes the hash value of the message content. In step 442, MNO 14 compares the independently computed hash value with the hash value Aggregator 16 appended to the message. If the hash values do not match, MNO 14 rejects the message in step 444. However, if the hash values do match, MNO 14 proceeds to step 446, in which MNO 14 verifies sender attestation issued by Aggregator 16. If attestation verification fails, MNO 14 rejects the message in step 448-otherwise, MNO 14 proceeds to step 450.

In step 450, after all of the above verification steps have been completed successfully, MNO 14 delivers the verified message to its target subscriber. Finally, in step 452, upon successful verification and delivery of the verified message, MNO 14 evokes "Protocol F" to monetize the verified traffic, as disclosed in more detail below.

Figure 6:
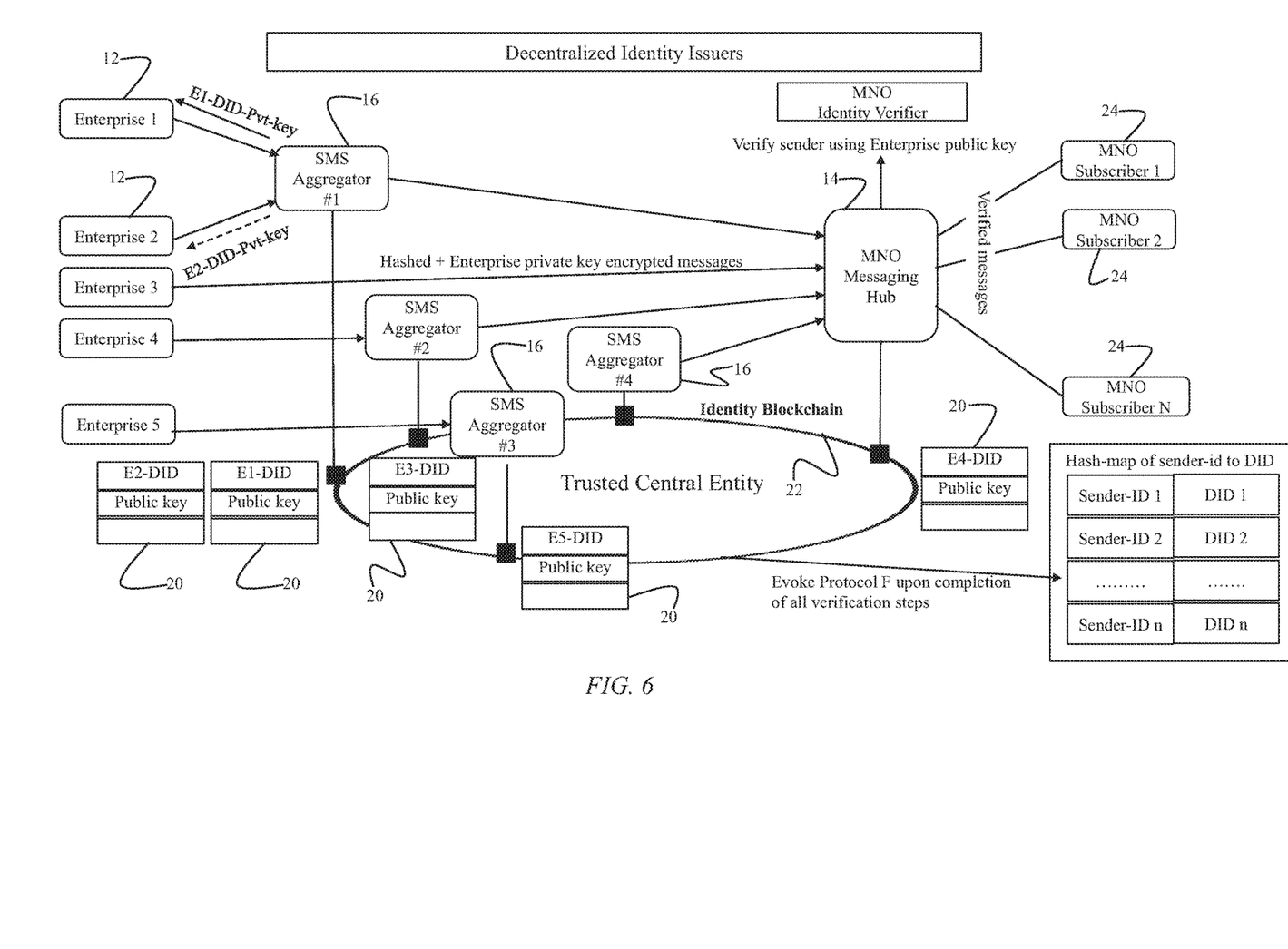
FIG. 6 is a diagram schematically depicting the architecture of an embodiment of the invention.

FIG. 6 schematically depicts an exemplary architecture of the present invention. FIG. 6 depicts that during an onboarding process, MNO 14 reviews documents submitted by Aggregator 16. Upon approval of the submitted documents, MNO 14 invokes a DPKI service to generate a private/public key pair for Enterprise 12 and a corresponding DID 18. MNO 14 securely shares the first private key with Enterprise 12 and registers DID 18 with Identity Blockchain 22, wherein DID 18 is configured to be resolved into a DID Document containing the public key of Enterprise 12. FIG. 6 further depicts that each DID 18 is mapped to a sender's address.

FIG. 6 shows that, in order to send a message (media object) to an MNO Subscriber 24, Enterprise 12 must send the message with an appended hash value calculated based on the media object content and encrypted using the private key issued to Enterprise 12 by MNO 14. In some embodiments, Enterprise 12 may be configured to send messages directly to MNO 14, while in other embodiment Enterprise 12 sends the message via Aggregator 16. In either case, the message can be verified by accessing the corresponding DID 20 and using the public key of Enterprise 12 to decrypt the hash, which can then be independently verified by computing the hash value of the message content and comparing the computed hash value against the decrypted hash value.

In the embodiment involving Aggregator 16, two-stage verification can be used: (1) in the first stage, Aggregator 16 uses DID 18 to verify sender address from which the message originated (FIG. 5B), and (2) in the second stage, MNO 14 uses DID 20 to verify Aggregator 16 and its attestation of the message (FIG. 5C). After all verification stages have been successfully completed, MNO 14 delivers the message to the target Subscriber 24.

Figure 7:
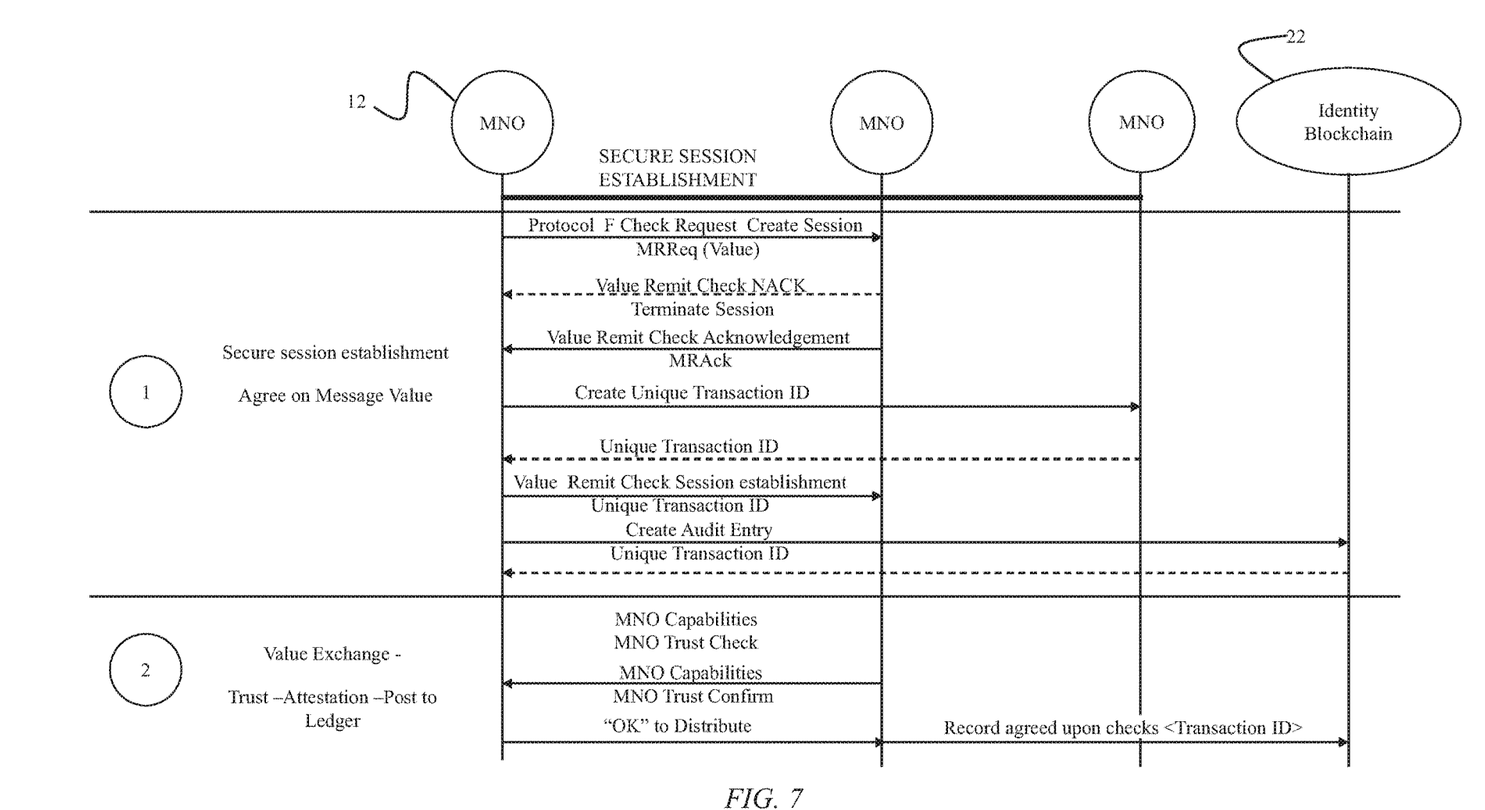
FIG. 7 is a signaling flow diagram depicting the process for evoking "Protocol F" after message verification.

Finally, upon verification and delivery of the message MNO 14 can evoke "Protocol F" by recording the transaction into Identity Blockchain 22. Protocol F enables MNO 14 to monetize the verified traffic. The recorded transaction creates a verifiable audit trail that does not contain any personally identifiable information (PII) regarding the message source or recipient. An example of successful transactions recorded with Identity Blockchain 20 is provided in FIG. 7.

Monetization of Verified Traffic

Figure 8:
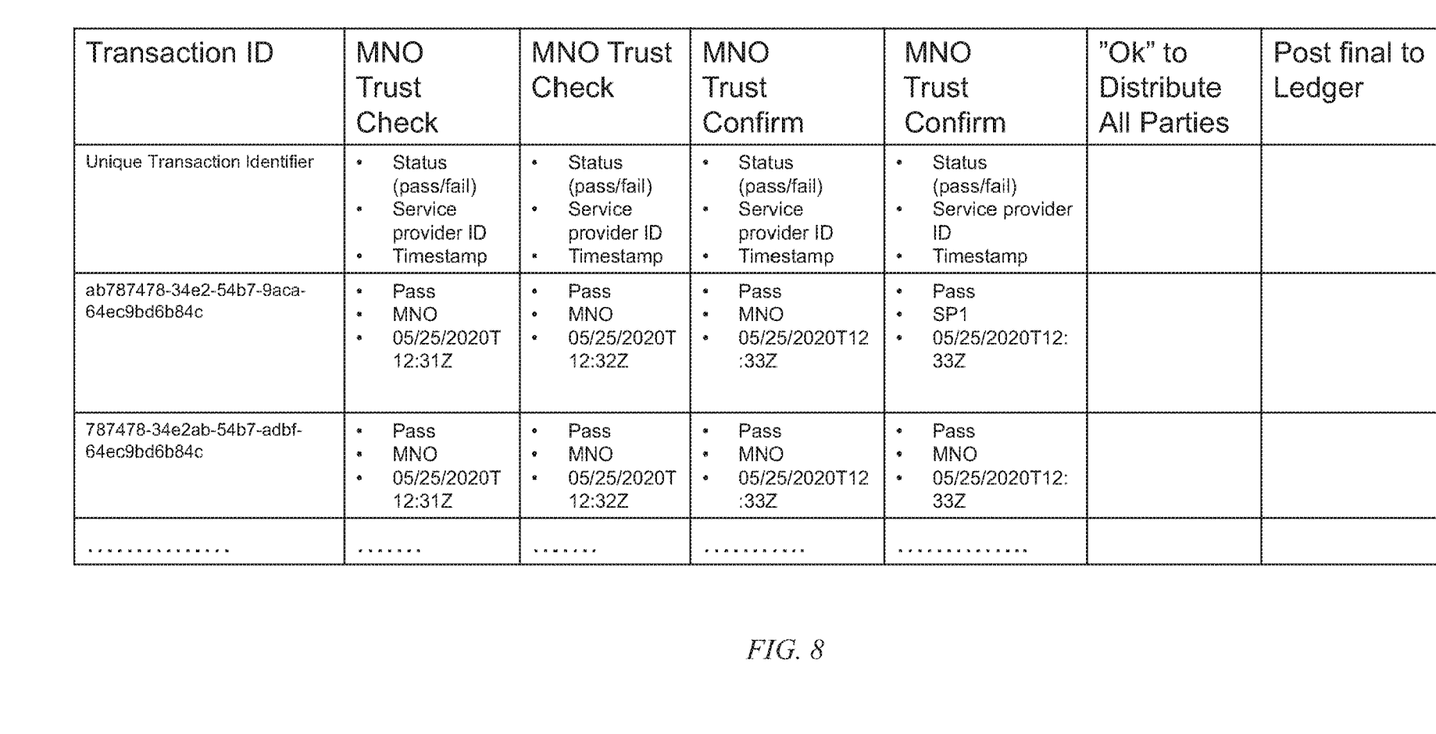
FIG. 8 is an exemplary audit trail recorded in the blockchain for the verified message transactions.

As disclosed above, upon successful verification and delivery of a media object to the target Subscriber 24, MNO 14 can evoke Protocol F. Referring to FIG. 8, Protocol F is a new protocol that enables MNO 14 to monetize verified source-destination traffic, after the traffic flows have been validated. MNO 14 can evoke Protocol F by recording the successful transaction with Identity Blockchain 22. Subsequently, funds allocated for traffic trust and attestation can be distributed among participating entities.

As depicted in FIG. 8, the amount of funds—variable "F"—can agreed upon by the participating entities during secure session establishment. The value of variable F is derived from maximum sums allocated for Trust and Attestation values. As further depicted in FIG. 8, the distribution of funds is triggered in response to "OK to Distribute" message from the verifying MNO 14 and upon recordation to the agreed-upon checks (see FIG. 7) into Identity Blockchain 22. In this manner, the present invention enables MNO 14 to first verify traffic and, then, monetize the verified traffic.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of verifying a media object sent via a telecommunication network from a sending entity to a receiving entity, the method comprising:
   invoking a decentralized public key infrastructure (DPKI) service to generate a first private key and a first public key for the sending entity;
   transmitting the first private key to the sending entity;
   generating a first Decentralized Identity (DID) configured to be resolved into a first DID document containing the first public key of the sending entity;
   registering the first DID with a blockchain, wherein the first DID can be retrieved from the blockchain based on an identifier provided with the media object;
   subsequent to registering the first DID with the blockchain, receiving the media object, wherein the media object includes a first hash value provided by the sending entity, the first hash value computed based on a content of the media object, and wherein the first hash value is encrypted with the first private key of the sending entity;
   identifying, within the blockchain, the first DID associated with the sending entity;
   resolving the first DID into the first DID document and retrieving, from the first DID document, the first public key associated with the sending entity;
   decrypting the first hash value included in the media object using the first public key retrieved from the first DID document;
   computing a second hash value based on the content of the media object;
   comparing the second hash value against the first hash value;
   responsive to the second hash value matching the first hash value, verifying the media object; and
   responsive to successfully verifying the media object, routing the media object to a target recipient.

2. The method of claim 1, wherein the sending entity is an enterprise or a media object aggregator.

3. The method of claim 1, wherein the receiving entity is a media object aggregator or a mobile network operator (MNO).

4. The method of claim 1, wherein the media object originates from an enterprise, the method further comprising:
   prior to receiving the media object, invoking the DPKI service to generate a second private key and a second public key for the enterprise;
   generating a second DID and a corresponding second DID document containing the second public key of the enterprise;
   registering the second DID with the blockchain, wherein the second DID is configured to be accessed on the blockchain using an address associated with the enterprise.

5. The method of claim 4, wherein upon receiving the media object sent by the enterprise, the media object is verified by the sending entity prior to routing the media object to the receiving entity.

6. The method of claim 5, wherein the sending entity verifies the media object by accessing the second DID document, retrieving the second public key of the enterprise, using the second public key to decrypt a third hash value provided by the enterprise, and comparing the third hash value against an independently computed fourth hash value, wherein the third and fourth hash values are computed based on the content of the media object.

7. The method of claim 5, wherein responsive to verifying the media object, the sending entity is configured to provide an attestation to the receiving entity.

8. The method of claim 7, wherein the receiving entity is configured to verify the attestation provided by the sending entity.

9. The method of claim 1, wherein the receiving entity registers with the blockchain a transaction record associated with verification of the media object.

10. The method of claim 9, wherein the receiving entity evokes a predefined protocol upon verifying the media object, whereby the predefined protocol is configured to trigger a predetermined monetary fund distribution to the receiving entity.

11. The method of claim 10, wherein subsequent to distribution of the predetermined monetary fund to the receiving entity, a corresponding message is posted to the blockchain.

12. The method of claim 1, wherein the media object is selected from the group consisting of a Short Message Service (SMS), a Multimedia Messaging Service (MMS), a Rich Communication Service (RCS), a voice service, and a combination thereof.

13. The method of claim 1, wherein the first DID is a pairwise DID specific to a relationship between the sending entity and the receiving entity.

14. A method of verifying a media object received by a receiving entity via a telecommunication network from a sending entity, the method comprising:
receiving the media object, wherein the media object includes a first hash value provided by the sending entity, the first hash value being computed based on a content of the media object, wherein the first hash value is encrypted with a first private key associated with the sending entity, and wherein a first public key associated with the sending entity is contained within a first Decentralized Identity (DID) document;
identifying, within a blockchain, a first DID associated with the sending entity;
resolving the first DID into the first DID document and retrieving, from the first DID document, the first public key associated with the sending entity;
decrypting the first hash value included with the media object using the first public key retrieved from the first DID document;
computing a second hash value based on the content of the media object;
comparing the second hash value against the first hash value;
responsive to the second hash value matching the first hash value, verifying the media object; and
routing the media object to a target recipient.

15. The method of claim 14, wherein the sending entity is an enterprise or a media object aggregator.

16. The method of claim 14, wherein the receiving entity is a media object aggregator or a mobile network operator (MNO).

17. The method of claim 14, wherein the receiving entity registers with the blockchain a transaction record associated with verification of the media object.

18. The method of claim 17, wherein the receiving entity evokes a predefined protocol upon verifying the media object, whereby the predefined protocol is configured to trigger a predetermined monetary fund distribution to the receiving entity.

19. The method of claim 18, wherein subsequent to distribution of the predetermined monetary fund to the receiving entity, a corresponding message is posted to the blockchain.

20. The method of claim 14, wherein the media object is selected from the group consisting of a Short Message Service (SMS), a Multimedia Messaging Service (MMS), a Rich Communication Service (RCS), a voice service, and a combination thereof.

* * * * *